United States Patent [19]

Minaire

[11] 4,443,111
[45] Apr. 17, 1984

[54] INSTALLATION FOR WASHING VEGETABLES, FRUITS OR SIMILAR PRODUCTS

[76] Inventor: André44, rue de Margnolles Minaire, 69300 Caluire, France

[21] Appl. No.: 388,268

[22] Filed: Jun. 14, 1982

[30] Foreign Application Priority Data

Jun. 23, 1981 [FR] France .............................. 81 12567

[51] Int. Cl.³ .............................................. B01F 15/02
[52] U.S. Cl. ............................ 366/165; 366/167; 68/181 R; 68/207; 68/208; 134/172
[58] Field of Search ................... 68/181 R, 208, 207; 366/131, 165, 167, 173, 183, 177; 134/172, 155, 180, 198, 186; 99/536, 516, 277.1, 277.2

[56] References Cited

U.S. PATENT DOCUMENTS

| | | | |
|---|---|---|---|
| 1,192,478 | 7/1916 | Vandercook | 366/165 X |
| 1,245,767 | 11/1917 | Randall | 68/181 R X |
| 1,580,476 | 4/1923 | Fassio | 366/173 X |
| 1,650,009 | 11/1927 | Charleston | 366/165 |
| 2,205,053 | 6/1940 | Thackeray | 134/198 X |
| 2,460,425 | 2/1949 | Mace | 134/198 X |
| 2,906,607 | 9/1959 | Jamison | 366/165 X |
| 3,304,063 | 2/1967 | Ranson . | |
| 3,904,779 | 9/1975 | Hinds . | |

FOREIGN PATENT DOCUMENTS

| | | | |
|---|---|---|---|
| 550696 | 4/1932 | Fed. Rep. of Germany | 68/208 |
| 1951470 | of 0000 | Fed. Rep. of Germany . | |
| 2053862 | of 0000 | France . | |
| 2403053 | of 0000 | France . | |
| 206355 | of 0000 | Switzerland . | |

*Primary Examiner*—Robert W. Jenkins
*Attorney, Agent, or Firm*—Parkhurst & Oliff

[57] ABSTRACT

An installation for the washing of vegetables, fruits or similar products comprising a cylindrical tank and a source of supply of water permitting not only the filling of the tank but also the driving of the mass of water in rotation around its vertical axis. This source of supply of water comprises at least one ramp arranged above the level of the water contained in the tank, the ramp being provided with holes which are directed downward and diagonally so that the jets which emerge therefrom strike the surface of the water and drive it in a movement of rotation.

9 Claims, 4 Drawing Figures

INSTALLATION FOR WASHING VEGETABLES, FRUITS OR SIMILAR PRODUCTS

The present invention relates to an improved installation for washing vegetables, fruits or similar products, this installation being of the type in which an eddy of water is formed within a stationary tank containing the products to be washed.

In order to simplify and improve the effectiveness of the washing operation, which is still very frequently carried out manually, different types of installations have been proposed, in particular for use in restaurants. These machines, however, have a certain number of drawbacks. In general they are relatively cumbersome, expensive both to manufacture and to use, and of complicated design since the driving of the water within the tank generally requires the presence of motors, moving parts, pumps, etc. to assure the circulation of the water.

It has been proposed, particularly in Swiss Pat. No. 206 355 and in U.S. Pat. No. 3,304,063, to have recourse solely to the pressure of household water to cause the formation of an eddy around a horizontal axis within a stationary tank, which eliminates the presence of motors and/or moving parts. However, these embodiments are not satisfactory, in particular because the impurities are difficult to eliminate and it is difficult to treat both heavy products, for instance potatoes, and very fragile products, for instance lettuce, strawberries, etc.

Furthermore, in French Pat. No. 69/24 833, published under No. 2 053 862, Applicant has proposed an installation which, in general, consists essentially of a cylindrical tank which can be associated with a cover which is provided on its outer face with a receptacle intended to be placed under a jet of water and which is extended below the cover by a bent tube directed in such a manner that the jet of water which emerges therefrom is oblique with respect to the surface of the water contained in the tank and is directed in such a manner as to drive the mass of water in rotation around the vertical axis of the tank. A vertical tubular column is preferably arranged at the center of the tank in order to avoid the formation of a cone in the center of the moving mass of water in the tank. The bottom of the tank is preferably slightly conical and has a small receptacle of cylindrical shape intended to receive the dirt, the lower end of the column, which is securely fastened to the tank, being preforated, it being possible to remove the dirt continuously while maintaining a constant level of liquid in the tank.

Such a washing apparatus is quite simple, but nevertheless has the drawback of being of poor efficiency since the driving in rotation of the mass of water is dependent on the speed of the jet of water emerging from the faucet, which speed is not always sufficient.

Furthermore, due to the presence of a cover at its upper part, such an apparatus requires handling upon loading and unloading of the installation. Finally, while it is satisfactory for household use, it is difficult to use for the simultaneous treatment of a large quantity of produce.

Now there has been found—and this constitutes the object of the present invention—an improved installation for washing vegetables, fruits or similar products which overcomes the drawbacks of the previous proposals, is simple to build and use since it does not require the presence of motors, pumps or moving parts for its operation and which, furthermore, can be used for the simultaneous treatment of large quantities of products, which products may be either heavy products or fragile products.

In general, the installation of the invention is of the type comprising:

a cylindrical tank, a supply source making it possible, on the one hand, to fill the tank with wash water and, on the other hand, to drive the mass of water in rotation around the vertical axis of the tank, evacuation orifices provided in the tank in order to maintain the amount of water constant and to drive the impurities towards the outside; and it is characterized by the fact that:

the supply source comprises at least one ramp arranged above the level of the water contained in the tank and provided with holes between the periphery and the center of the tank, these holes being directed downward and diagonally so that the jets emerging therefrom strike the surface of the water and drive it in a movement of rotation which assures the washing of the products contained in the tank, driving of the impurities of dirt towards the outside being assured by the discharging of the water through orifices provided for this purpose.

In one embodiment of the invention, the tank is of circular shape and has orifices on its bottom and periphery, effectively forming a strainer, the ramp being formed of a linear tube placed diametrically and horizontally and connected to a water inlet, the holes being arranged on opposite sides of the vertical axis of the tank and being directed so as together to assure the rotation of the water in a given direction. In other words, in this embodiment the ramp is formed of two individual ramps arranged one as an extension of the other.

In accordance with a preferred embodiment, the ramp is formed of a tube which is staggered with respect to the diametral plane of the tank, the jets emerging from said ramp striking the water contained in the tank in this diametral plane. As previously, the installation may comprise two ramps provided with orifices between the periphery and the center of the tank, the orifices of each of the ramps being directed so as together to assure the rotation of the mass of water. In this embodiment, the two ramps are preferably connected together by a common central portion and the feeding of water is effected through each of the ends, which not only permits the jets to strike the surface of the water substantially along a diameter but furthermore permits them to converge slightly towards the center.

Furthermore, the installation preferably comprises, at the center of the tank, a vertical tubular column having perforations over its entire height through which perforations the suspended impurities pass, a discharge orifice being provided at the bottom of said tubular column. In this embodiment, the column is preferably mounted in movable manner on the bottom of the tank and has at its base a disk provided at its center with a discharge orifice, this disk extending to cover an orifice of large size provided in the bottom of the tank and making it possible to assure a rapid drainage of said tank after use. Furtheremore, the discharge orifice of this central column is preferably combined with means which make it possible temporarily to close it upon the filling of the tank. These means may be formed, for instance, of a valve of a simple movable rod whose end can plug the discharge orifice.

Finally, the feed source may comprise not only a ramp producing jets outside the mass of water but also one or more injectors, immersed in the mass of water, discharging, for instance, into the bottom of the tank, these injectors also producing oblique jets creating a turbulent movement. These internal jets can be used either jointly with the external jets or by themselves, particularly when it is desired to assure the washing of fragile products such as, for instance, lettuce, strawberries, etc.

The invention and the advantages which it entails will, however, be better understood by reference to the embodiments given by way of illustration and not of limitation below and shown in the accompanying drawings, in which.

In the following description, the same parts will be designated by the same reference numbers for the two embodiments described.

Figure 1:
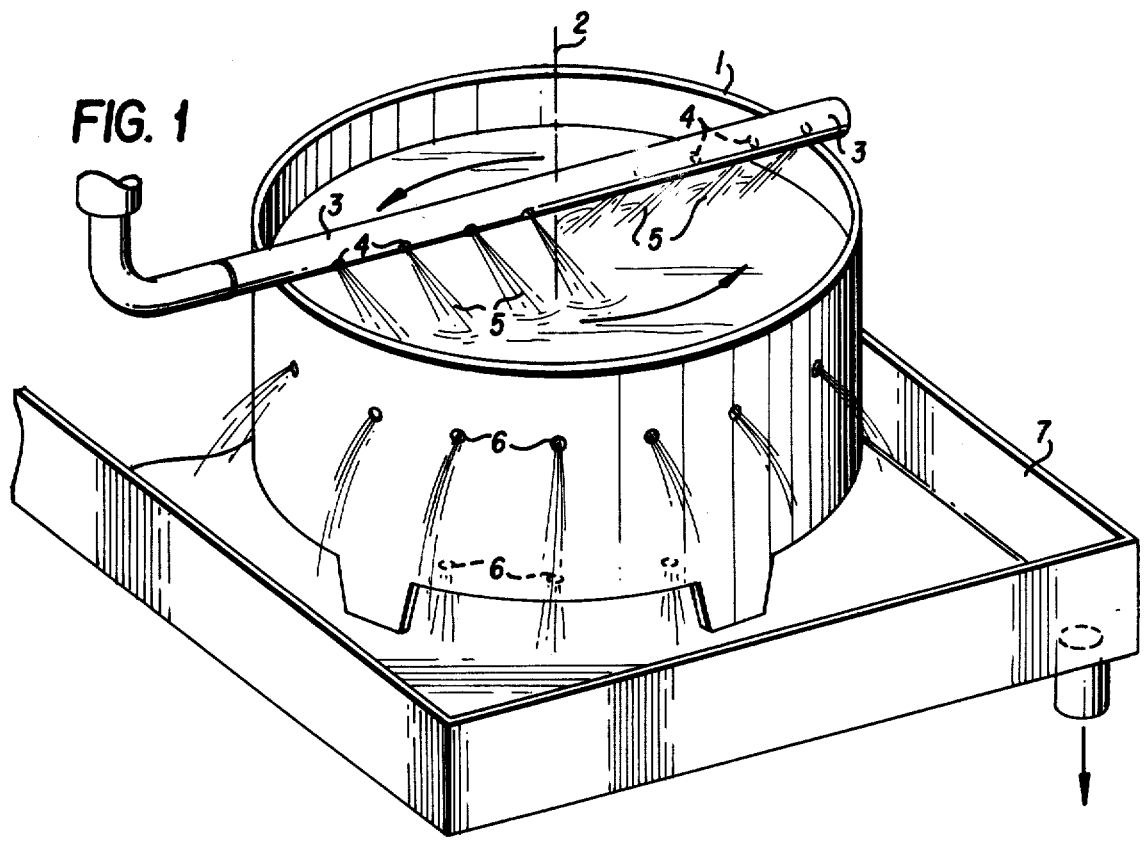
FIGS. 1 and 2 illustrate diagrammatically in perspective two embodiments of an installation in accordance with the invention.

Referring to the accompanying drawings, the installation of the invention for the washing of vegetables, fruits or similar products comprises a cylindrical tank 1 with vertical axis 2. This tank is associated with a supply source which makes it possible, on the one hand, to fill it with wash water and, on the other hand, to drive said mass of water in rotation around the vertical axis 2 of the said tank 1. Furthermore, discharge orifices 6 make it possible to maintain the amount of water in the tank 1 and to drive the impurities towards the outside.

In accordance with the invention, the water supply source comprises at least one ramp 3 arranged above the level of the water, this ramp being provided with holes 4 between the periphery of the tank 1 and the central axis 2, these orifices 4 being directed downward and diagonally so that the jets 5 which emerge therefrom strike the surface of the water and drive it in a movement of rotation which simultaneously assures washing of the products contained in the tank 1, with driving of the impurities towards the outside being assured by the discharge of the water through the orifices 6 provided for this purpose.

Figure 2:
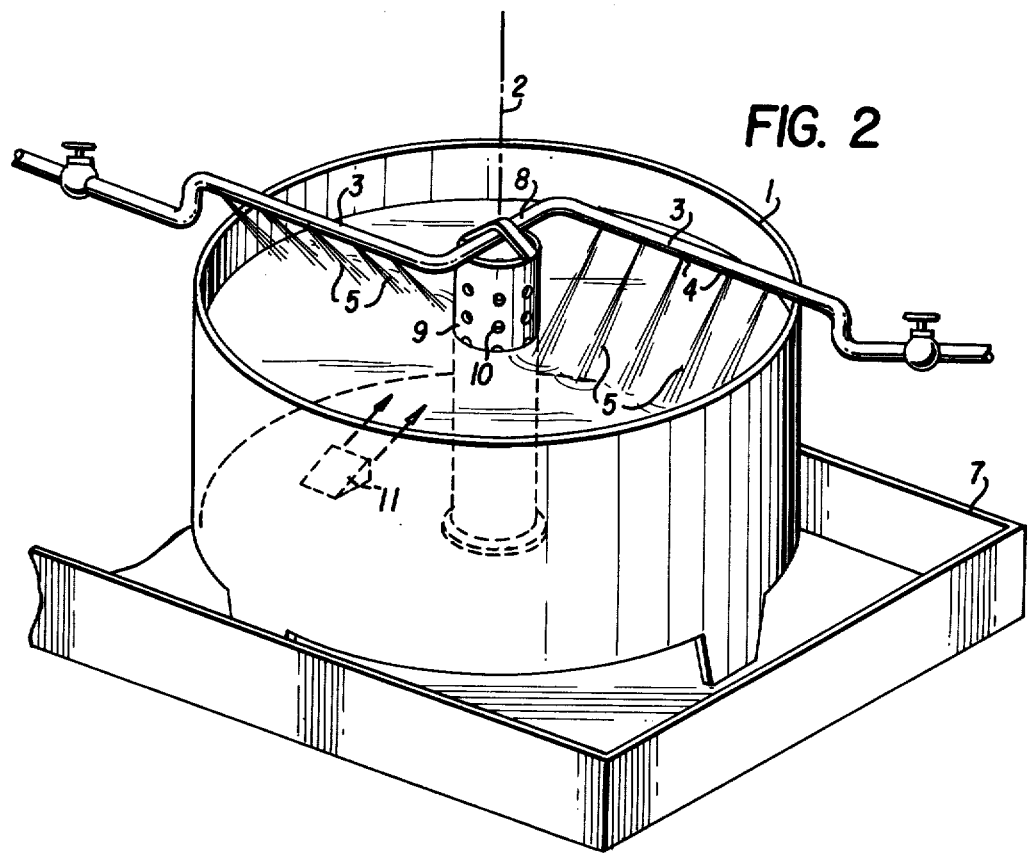

In the two embodiments illustrated in FIGS. 1 and 2, the source of supply water comprises two ramps 3 arranged on opposite sides of the vertical axis 2, the respective orifices 4 of each of these ramps 3 being directed in opposite directions and together assuring driving of the mass of water in rotation.

In the embodiment illustrated in FIG. 1, the two ramps are arranged as extensions of each other along a diametral plane of the tank 1. Furthermore, feeding of water is effected through one of the ends of one of the ramps 3, the other end being closed. Of course, feeding of water could be effected in any other manner, for instance by feeding the two ends simultaneously or by effecting the feed from the central portion present between the two ramps 3.

In the embodiment illustrated in FIG. 1, discharge of the water is obtained through simple orifices 6 provided on the periphery and bottom of the tank 1, the size of these orifices being such that the level of the water within the tank is maintained, preferably constant, as a function of the rate of flow coming from the ramps 3, the water and the impurities being evacuated into a secondary pan 7 within which the tank 1 is arranged.

Figure 3:
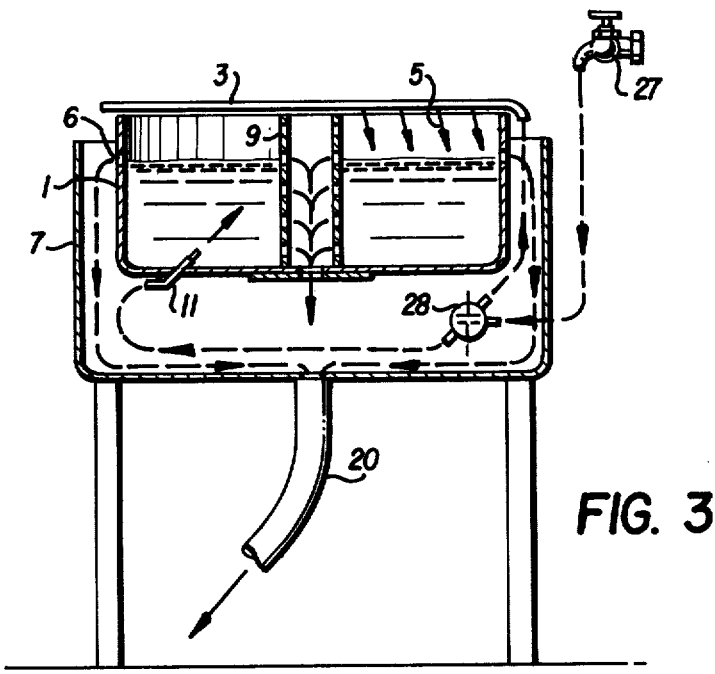
FIG. 3 is a sectional view in elevation illustrating in further detail the operation of an installation developed in accordance with FIG. 2.
Figure 4:
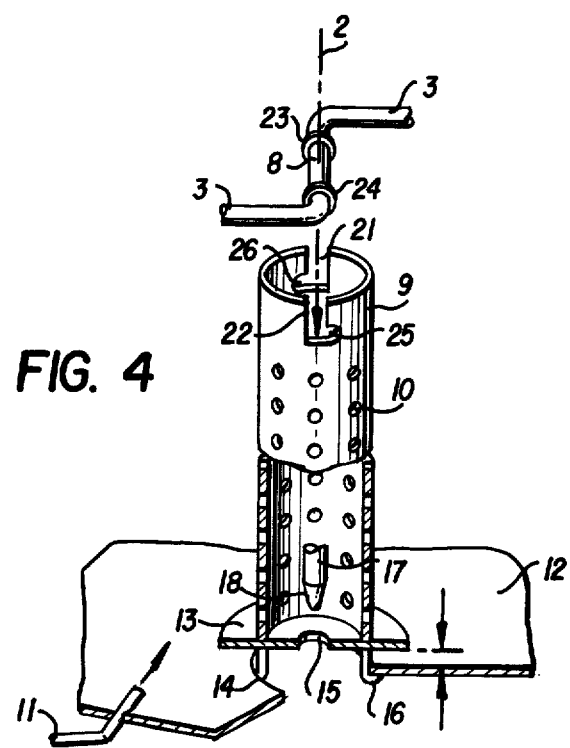
FIG. 4 is a partial diagrammatic view in cross section showing in detail the manner in which the central column is formed.

FIGS. 2, 3 and 4 illustrate a preferred embodiment of an installation in accordance with the invention which makes it possible to increase the efficiency of the installation. In this embodiment, the feed of water is also effected by means of two ramps 3 having orifices 4 directed in opposite directions and which, as previously, strike the water at an angle with the surface thereof in such a manner as to drive it in rotation. In this variant, the two ramps 3 are spaced from the diametral plane 2 in such a manner that the jets strike the water at the level of the diametral plane. It has been found that by proceeding in this manner driving of the water is effected much more efficiently. Furthermore, the two ramps 3 are connected together by a common central portion 8 and feeding the water is effected from each of the ends. Therefore, in the common central part 8 the flow is zero and the jets 5 emerging from the orifices 4 have a tendency to converge slightly towards the center, which further increases the driving in rotation of the mass of water.

In this preferred embodiment, the discharge of water is obtained, on the one hand, through a central column 9 having perforations 10 and, on the other hand, through a ring of orifices 6 provided at the upper part of the tank 1. This column 9 may also serve as an element for holding the central portion 8 which is common to the two ramps 3.

As appears from FIG. 4, the central column 9 is mounted on the bottom 12 in such a manner that it can be displaced vertically. In this embodiment, the central column 9 has a disk 13 at its base which, when the column is lowered, closes an orifice 14 of large size provided in the bottom of the tank 1. This disk 13 is provided in its central portion with an orifice 15 of smaller diameter. Therefore, when the column 9 is applied against the base 12 of the tank 1, the water is evacuated through orifices 10 and orifice 15. On the other hand, particularly when it is desired to empty the tank rapidly, the column 9 is lifted slightly so as to free the orifice 14, the water then flowing into the enclosure 7 and being discharged through conduit 20. The holding and positioning of the column 9 are assured by any suitable means such as, for instance, claws 16. Furthermore, column 9 is associated with means 17 for temporarily closing the central discharge orifice 15 when it is desired to fill the tank 1. These closure means 17 may consist of a valve or of a rod whose end 18, which for instance is of conical shape, and is adapted to fit snugly inside the orifice 15. As is clearly evident from FIG. 4, the column 9 may, as previously stated, be adapted to serve as a support element for the ramp 3. In this embodiment, the holding of the ramps 3 at the end of the column 9 is obtained by providing notches 21–22 which are diametrically opposite. In FIG. 4, the column 9 is shown separated from the ramps 3 but in normal operation the central part 8 which is connected to the ramps 3 is engaged in the notches 21–22 in sliding manner, lateral displacement being eliminated by providing stop rings 23–24 on the central part 8. As a result of such an embodiment it is possible to displace the column 9 vertically by simple sliding. When it is desired to empty the tank 1, one may provide at the ends of the notches 21–22 return portions 25–26 which make it possible to hold the column in raised position.

The manner of use of such an installation is as follows: The central column 9 is lowered against the bottom 12 of the tank 1, the discharge orifice 15 is closed by means of the rod 17 and the tank 1 is filled via the ramp 3. When the tank 1 is full, the vegetables are placed within the tank and the washing is effected. Upon washing, the rotation driving of the water can be obtained either by the action of the injectors 11 or by the combination of these two means. The various water feed circuits are indicated diagrammatically in broken line in FIG. 3, and these circuits may be connected to a house faucet 27 and the distribution between the injectors and/or the ramps 3 obtained by means of a conventional switching system 28.

After the washing operation, the surplus water fed, as well as the impurities, discharge through orifices 10 in the column 9 as well as through the ring of orifices 6 provided in the upper portion of the tank 1. In general, the light impurities are discharged through the upper orifices 6 while earth or heavy impurities are concentrated, due to the rotation of the mass of water, towards the central portion and are discharged through the orifices 10.

The washing being completed, when it is desired to empty the tank, the column 9 is raised (see FIG. 4) and may be locked in position by slightly pivoting it, as a result of the presence of the notches 26–25. Thereupon, the large opening 14 is freed and the water is driven through this opening so as to discharge into the enclosure 7 and be evacuated through the conduit 20. Evacuation of the water not only takes place rapidly but also makes it possible to entrain the impurities which may have accumulated at the bottom of the enclosure 7.

In both of the embodiments described above, the oblique jets of water 5 strike the surface of the water into which they penetrate, drive it in rotation and therefore also drive the vegetables, fruits or similar products arranged within the tank.

As stated previously, the source of supply of water can, in both of the embodiments described, comprise not only a ramp 3 which produces jets 5 outside the mass of water, but also injectors or the like 11 which are immersed in the mass of water and which preferably discharge into the bottom 12 of the tank 1. These injectors 11 can, for instance, be two in number, arranged symmetrically on opposite sides of the central axis of the tank 1 and directed in opposite directions. Within the mass of water they produce oblique jets which drive the water in rotation and which can be used either jointly with the external jets 5 or by themselves, in particular when it is desired to wash fragile products.

Such an apparatus is not only of very great simplicity but also of very great effectiveness. While in general feeding of water could be effected directly from an ordinary faucet, it might be contemplated, for instance in the event that the pressure were insufficient, to provide an additional pump. Of course, the invention is not limited to the foregoing embodiments but also covers all variants falling within its scope. Thus, one could contemplate multiplying the number of ramps and/or internal injectors making it possible to drive the water in rotation, when it is desired to increase the intensity of the washing. Likewise, one could combine with such an installation various known systems which also make it possible to effect an additional inner stirring, for instance systems which permit blowing air within the interior of the mass of water itself.

Finally, while in the present description the ramps used are of a linear configuration, it could also be contemplated to impart some other shape to them, for instance a circular shape, provided, however, that the orifices provided in these ramps are also directed in such a manner that the jets drive the mass of water in rotation.

As compared with the previously known solutions, in addition to the fact that this installation eliminates any moving part, it is of very great simplicity in concept and in operation, with risks of breakdown being eliminated. It also permits rapid and excellent washing and this both for heavy products and for fragile products. Furthermore, complete hygiene is assured due to the fact that there is no recycling of water. Furthermore, as a result of the great efficiency in operation the amount of water necessary for washing is substantially reduced. Finally, in view of the fact that the wash tank is open at the top, the operations of introducing the vegetables and removing them after washing are simplified, and removal can be effected by means of a collection basket which is immersed in the tank, which avoids the necessity of draining the tank. One can therefore contemplate using such an installation continuously, without any downtime.

I claim:

1. Apparatus for washing vegetables, fruits or similar products, comprising:
    a cylindrical tank,
    a source of supply for filling the tank with wash water and driving the resultant mass of water in rotation around the vertical axis of the tank,
    discharge orifices in the tank for maintaining the amount of water constant and driving impurities towards the outside,
    wherein the source of supply comprises at least one ramp arranged above the level of the water contained in the tank and provided with holes along the ramp from the periphery to the center of said tank, with said holes being oppositely directed on each side of the center of said tank, said holes being oriented diagonally downward so that jets emerging therefrom strike the surface of water in the tank and drive substantially all of the water in a movement of rotation which assures washing of the products contained within the tank, thus driving impurities towards the outside by the discharge of water through orifices provided for this purpose.

2. The apparatus of claim 1, wherein the tank is of circular shape and comprises orifices on its bottom and periphery, forming a strainer, the ramp being formed of a linear tube located diametrically and horizontally and connected to a water inlet, said holes being arranged on opposite sides of the vertical axis of the tank and being oriented to assure collectively the rotation of the water in a given direction.

3. The apparatus of claim 1, wherein the ramp is formed of at least one tube which is staggered with respect to the diametral plane of the tank, with orifices in said tube, said orifices for forming jets emerging from said ramp so that such jets strike water contained in the tank in said diametral plane.

4. The apparatus of claim 3, comprising two ramps provided with orifices between the periphery and the center of the tank, the orifices of each of the ramps being directed so as to assure collectively rotation of the mass of water.

5. The apparatus of claim 4, wherein the two ramps are connected together by a common central part, the feeding of water being effected through each of the ends of the ramps.

6. The apparatus of claim 1, comprising at the center of the tank, a vertical tubular column having perforations over at least a part of its height, through which perforations the suspended impurities pass, an evacuation orifice discharging at the bottom of said tubular column.

7. The apparatus of claim 6, wherein the central column is mounted on the bottom of the tank in such a manner that it can be displaced vertically, said central column comprising a disk at its base which, when the column is lowered, closes off the discharge orifice at the bottom of the tank, said disk having in its central portion an orifice of smaller diameter than the disk itself so that when the column is placed against the bottom of the tank, the water is discharged through the orifices and said smaller orifice while, when the column is slightly raised, the opening is free, permitting rapid drainage of the tank.

8. The apparatus of claim 7, wherein the column is associated with means for closing temporarily the discharge orifice during filling of the tank.

9. The apparatus of claim 1 wherein the source of supply of water comprises at least one injector immersed in the mass of water within which it produces oblique jets driving said water in rotation, said internal jets being capable of being used either jointly with the external jets or by themselves to assure washing of fragile products.

* * * * *